United States Patent [19]

Delchev et al.

[11] Patent Number: 4,698,965
[45] Date of Patent: Oct. 13, 1987

[54] HOT GAS SOURCE AND FUEL THEREFOR

[76] Inventors: Nedelko E. Delchev, 429 W. Elk, Apartment A, Glendale, Calif. 91204; Ognian N. Tzonev, 5447 Russell, Hollywood, Calif. 90027

[21] Appl. No.: 487,620

[22] Filed: Apr. 22, 1983

Related U.S. Application Data

[63] Continuation-in-part of Ser. No. 255,246, Apr. 17, 1981.

[51] Int. Cl.$^4$ .................. B63H 11/12; C06B 47/00
[52] U.S. Cl. ........................... 60/227; 60/218; 60/217; 60/219; 149/1
[58] Field of Search .............. 60/217, 218, 219; 413/579; 149/1

[56] References Cited

U.S. PATENT DOCUMENTS

| | | | |
|---|---|---|---|
| 2,645,079 | 7/1953 | Doumani | 60/218 |
| 2,944,385 | 7/1960 | Toops | 149/1 |
| 2,955,032 | 10/1960 | Osborg et al. | 149/1 |
| 3,082,598 | 3/1963 | Mahan | 149/1 |
| 3,135,703 | 6/1964 | Sill | 60/277 |
| 3,142,151 | 7/1964 | Roberts et al. | 60/218 X |
| 3,156,089 | 11/1964 | Baumgartner et al. | 60/218 |
| 3,286,954 | 11/1966 | Swet | 244/1 |
| 3,333,419 | 8/1967 | Baumgartner et al. | 60/218 |
| 3,691,769 | 9/1972 | Keilbach et al. | 149/1 |
| 3,884,836 | 5/1975 | Kühl et al. | 423/579 |
| 3,980,064 | 9/1976 | Ariga et al. | 123/457 |
| 4,196,017 | 4/1980 | Melville et al. | 127/41 |
| 4,294,586 | 10/1981 | Cox | 44/53 X |
| 4,366,130 | 12/1982 | Khare | 423/183 X |

FOREIGN PATENT DOCUMENTS

| | | | |
|---|---|---|---|
| 49-67897 | 1/1974 | Japan | 252/471 |
| 49-67891 | 1/1974 | Japan | 252/471 |

OTHER PUBLICATIONS

Griffin, "Rocket Car, Faster Than Sound", *Car & Driver*, 4/80, p. 68.
Rocketdyne, Rocket Missile Propulsion, p. 54, 112–116.

*Primary Examiner*—John F. Terapane
*Assistant Examiner*—T. J. Wallen
*Attorney, Agent, or Firm*—Lyon & Lyon

[57] ABSTRACT

A method, apparatus and the fuel therefor for creating a hot gas jet hydrogen peroxide in a maximum aqueous solution of 55% to which is added a burnable substance. The mixture is passed through a permeable mass of catalytic material such as manganese dioxide in the form of granules of natural pyroluside where the hydrogen peroxide is broken down into water and oxygen. The oxygen thus formed is combined with the burnable substance which may be sugar, coal dust, alcohol, gasoline or other common fuels. Water is added to the mixture to insure storage stability of the hydrogen peroxide.

15 Claims, 2 Drawing Figures

HOT GAS SOURCE AND FUEL THEREFOR

This is a continuation-in-part of U.S. patent application Ser. No. 255,246, filed Apr. 17, 1981 in the name of Delchev et al., entitled Hot Gas Source

BACKGROUND OF THE INVENTION

The field of the present invention is means for generating hot gas.

Since at least as early as World War II when the German V-2 rocket employed hydrogen peroxide in combination with permanganate as catalyst to run a turbine, the concept of rapidly converting hydrogen peroxide to water and oxygen for use as a source of hot gases has been known and used. More recently, a land speed record vehicle employed a permeable mass of catalyst in the form of silver screens through which hydrogen peroxide was forced. The steam and oxygen created by this process was then used as a pure rocket to drive the vehicle to several hundred miles an hour. However, difficulties exist with the use of hydrogen peroxide because of its rather unstable nature when found in substantial concentration. Consequently, this substance has found little utility in more mundane uses for creating such a high temperature, pressurized gas.

The resulting products from the decomposition of hydrogen peroxide are water and oxygen. These products are advantageously harmless to both the environment and humans. Thus, use of such a source in confined or controlled areas does not present a problem from the standpoint of the generated exhaust.

SUMMARY OF THE INVENTION

The present invention is directed to a hot gas source and the fuel therefor using hydrogen peroxide in combination with other substances presented in a safe form to realize maximum power benefits from the hydrogen peroxide. The concept of passing hydrogen peroxide through a catalyst to rapidly decompose the substance to water and oxygen has been combined with the introduction of a burnable substance. This substance may be one of a very large variety of substances which can be oxidized in the environment of the decomposition of hydrogen peroxide. Among the possible substances which may be combined with the hydrogen peroxide are alcohol, sugar, coal dust, gasoline and other common fuels. To stabilize the hydrogen peroxide, it has been found that a substantial amount of water may be added to the hydrogen peroxide. This additional water is converted to steam in the process.

The introduction of the hydrogen peroxide and burnable substance makes use of the free oxygen which is a product of the decomposition of hydrogen peroxide. In fact, it is believed that the oxygen is atomic rather than molecular, as it first separates from the hydrogen peroxide. Thus, the oxygen is even more susceptible to combining with the burnable substance. If a proper mixture is used, such that a near stoichiometric ratio is combusted, the resulting combusted gases include steam, carbon dioxide, and oxygen. Consequently, the system is very clean burning in that carbon monoxide and free hydrocarbons can be virtually eliminated. Furthermore, as air is not employed in this system, no NOx would normally be formed.

Thus, a high energy, practical and polution-free hot gas source is created by the present invention. Accordingly, it is an object of the present invention to provide an improved source of hot gases including both a device and the fuel used therewith. Other and further objects and advantages will appear hereinafter.

DETAILED DESCRIPTION OF THE PREFERRED EMBODIMENT

Figure 1:
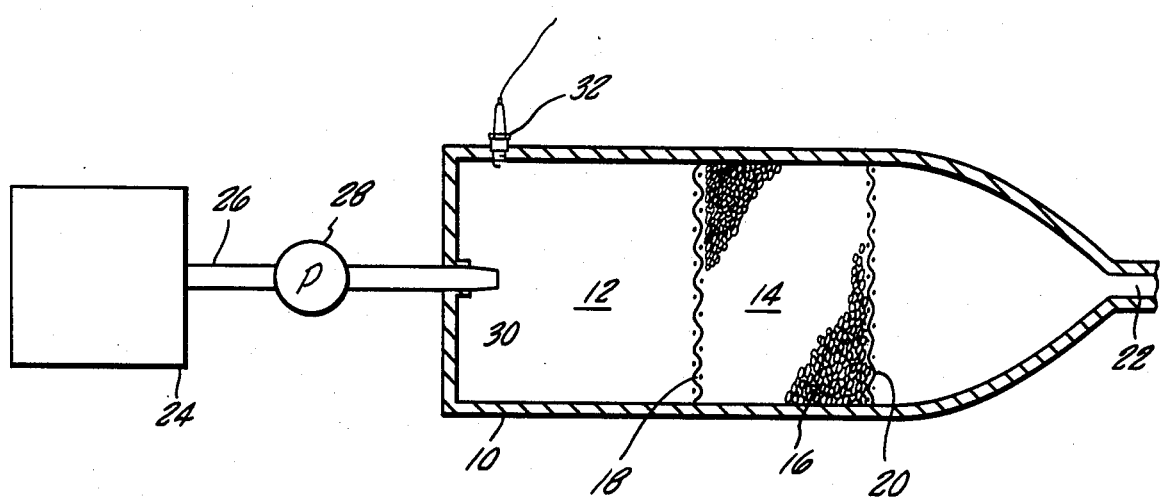
FIG. 1 schematically illustrates a device of the present invention.

FIG. 1 schematically illustrates a device of the present invention including a reaction chamber 10. The reaction chamber 10 is conveniently cylindrical and is preferably made of stainless or other temperature resistant material. In the preferred embodiment, this reaction chamber 10 is divided into two sections. A first section 12 is substantially unobstructed while a second section 14 is filled with a permeable catalyst such as granular manganese dioxide material 16 between two screens 18 and 20. The catalyst employed must be selected from the group of catalysts which rapidly decompose hydrogen peroxide and which will not melt in the generated high temperature environment of the reaction chamber 10. The screens 18 and 20 are preferably of a heat resistant material such as stainless steel. The granular manganese dioxide is a permeable mass allowing gas flow therethrough.

At the outlet end of the reaction chamber 10 is an outlet 22. This outlet 22 may be formed in any convenient shape in accordance with conventional high velocity nozzle theory. Naturally, the shape of this outlet 22 will vary depending on the use to which the hot gas is to be put and may in fact not require a nozzle for certain applications.

To the left of the reaction chamber 10 is a source connected by a conduit 26 to the first chamber 12 via a pump 28. The pump 28 overcomes the pressure generated within the reaction chamber 10 and also controls the rate of flow of the mixture into the reaction chamber. At the entrance to the reaction chamber 10, a nozzle 30 is employed for dispersion of the mixture into the first chamber 12. This nozzle 30 is to be configured for low velocity dispersion into the reaction chamber 10.

The source of the reacting components may in fact involve a plurality of tanks if the components are not advantageously stored together. This source may also extend in two parallel paths to the reaction chamber and the several reacting components not combined until they are in the reaction chamber 10. The reacting mixture may also include dry material as well as liquids.

The principal component of the reacting mixture is hydrogen peroxide. When hydrogen peroxide is combined with a catalyst such as manganese dioxide, it undergoes a very rapid and exothermic breakdown into water and oxygen. The heat generated is substantial and steam is generated. Added to the hydrogen peroxide is a burnable substance capable of an exothermic reaction when combined with oxygen. This burnable substance need not necessarily be considered burnable at ambient temperatures in air for the present purposes. The high temperature environment within the reaction chamber 10 and the presence of oxygen, which is believed to come off the hydrogen peroxide in an atomic state, expands the range of materials which may be used. It has been found that alcohol and sugar are each very useful in the present device. Furthermore, these materials are substantially homogeneously mixed with the aqueous solution of hydrogen peroxide in the tank 24 and therefore easily handled.

The hydrogen peroxide has been found to be relatively unstable in high concentrations. Consequently, water has been added to the mixture. The water of course does not react with the other components. However, it does expand when heated into a gas which adds to the overall volume of material ejected through the outlet 22.

A wide range of proportions of components of the reacting mixture may be found useful for a variety of uses. However, it has been found that mixture of a 40% hydrogen peroxide, 40% water and 20% ethyl alcohol, by weight, works very well for generating substantial heat and pressure with a very clean exhaust. For starting purposes, it has been found useful to include aluminum oxide with the permeable catalyst mass to insure complete oxidation of the alcohol.

To ensure ignition of this mixture for combining the burnable material with oxygen, a glow plug 32 is provided. The glow plug 32 need only be employed in the startup of the process. Once going, ignition continues in the high temperature and pressure environment without additional heat from the glow plug.

Figure 2:
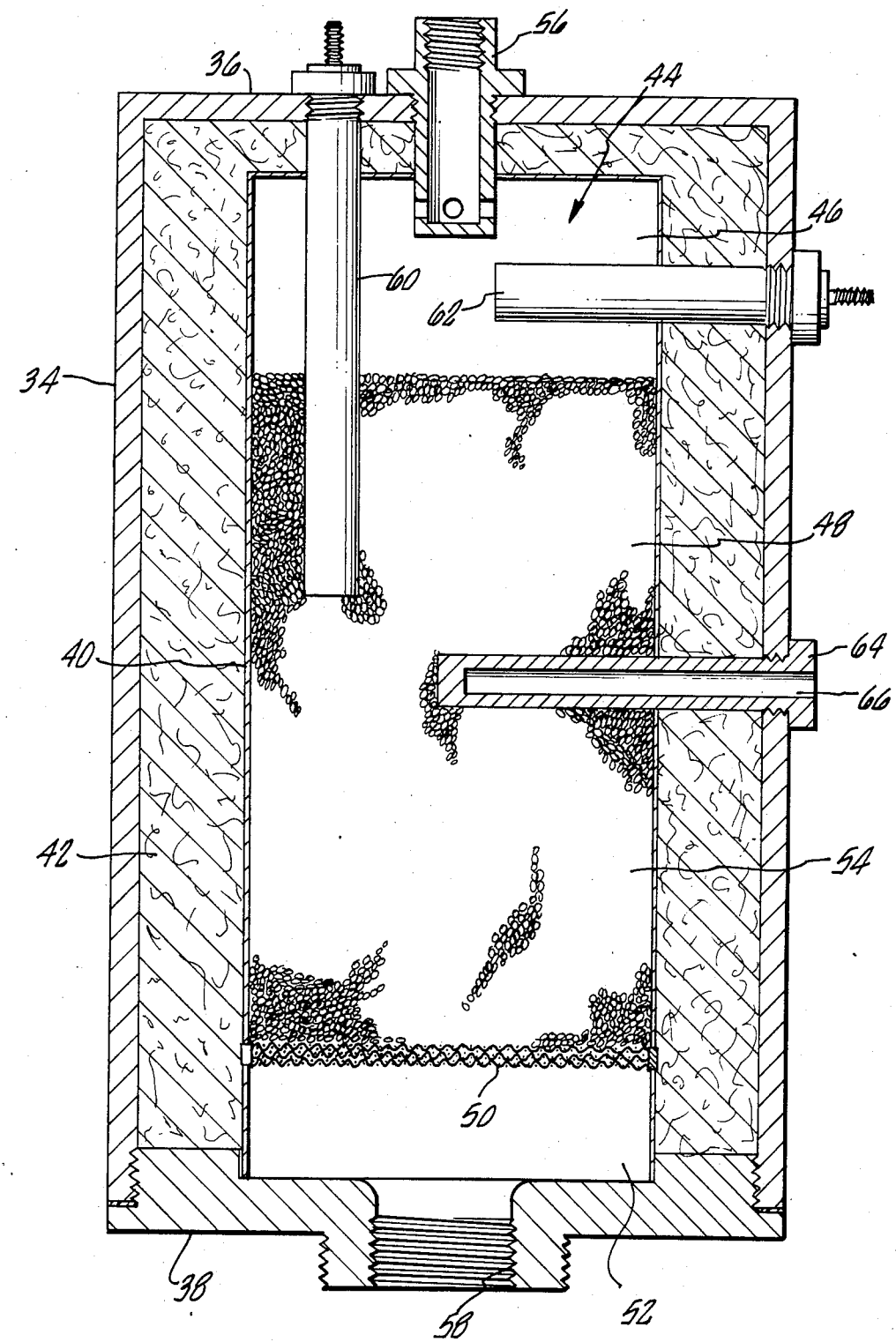
FIG. 2 illustrates a cross-sectional elevation of a device of the present invention.

Looking to FIG. 2, a device illustrating in greater detail the features of the present invention are disclosed. The device is generally constructed of stainless steel. A case 34 is conveniently formed in a cylindrical shape having a top 36 integrally fixed thereto and a bottom 38 threaded into the wall of the case 34. The case 34, top 36 and bottom 38 define a pressure chamber capable of withstanding the pressures comtemplated. Inwardly of the case 34 is a stainless steel liner 40. The stainless steel liner 40 also is provided with a top and bottom as well as a cylindrical side wall. This liner 40 is of thin walled construction to reduce or minimize the heat capacity of the liner. In this way, the liner is very quickly heated. Contained between the case 34 and the liner 40 is a layer of insulation 42. The insulation 42 must be capable of withstanding relatively high temperatures and yet provide a meaningful reduction in heat flow between the liner 40 and the case 34. Ceramic fibers of aluminum oxide have been found to be advantageous in this arrangement.

Within the liner 40 is the reaction chamber 44. This reaction chamber is divided into a first section 46 generally free of catalyst and a second section 48 wherein the catalyst is contained. In the embodiment of FIG. 2, stainless steel screens 50 are fixed in place across the reaction chamber to the liner 40. A third section 52 is provided beneath the screens 50 for collection of the gasses for discharge. The upper end of the second section 48 may be defined by additional screens where the device may be tipped or disoriented. In this embodiment, that is not contemplated and there is no barrier between the first and second sections to retain the catalyst.

The catalyst 54 employed is natural manganese dioxide in granular form, natural pyrolusite. The material is preferably such that it will not become highly compacted or in any way filter through the screens 50. The material employed has been found to withstand substantial temperatures in excess of 1200° F., the normal melting temperature for manganese dioxide. It is understood that the catalyst, apparently resistant to such temperatures, forms trimanganese fouroxide ($Mn_3O_4$) which is solid at much higher temperatures. The nature of the natural pyrolusite also avoids porosity within the granules common to produced manganese dioxide. Such porosity would result in a breaking up of the granules with the heating and cooling of water contained within such porous material.

Flow through the reaction chamber 44 is accommodated by an inlet nozzle 56 threaded through the case 34 and an outlet nozzle 58 formed in the bottom 38. The inlet nozzle 56 is designed to provide a distribution of the incoming material throughout the first section 46, employing multiple holes about a circumference of the nozzle for introduction of the material. The inlet nozzle 56 is also threaded to accept a source conduit 26 such as schematically illustrated in FIG. 1. The outlet nozzle 58 is also threaded to accept nozzle inserts for controlling flow from the reaction chamber 44 as may be needed.

In starting up the device, it is beneficial to use a glow plug. Two glow plugs 60 and 62 are disclosed to give an optimum coverage both above the second section 48 and into the catalyst contained within the second section 48. The glow plugs may run continuously or may be shut down once ignition of the burnable material within the fuel is experienced. Also extending into the reaction chamber 34 is a thermally conductive plug 64 with a bore 66 therethrough for receipt of a thermal couple or other similar temperature monitoring device.

The fuel contemplated for this device is, as stated above, a stable hydrogen peroxide in combination with a burnable substance. The burnable substance is preferably in a concentration near but below the stoichiometric ratio. By providing combustible material below the stoichiometric ratio, full combustion of that material is insured, with a portion of the oxygen remaining uncombined. As a result, with the exception of impurities in the fuel mixture, hydrogen peroxide and a hydrocarbon or carbohydrate will create water and carbon dioxide with oxygen left over. At or above the stoichiometric ratio, not all of the burnable substance will be properly oxidized to these simple and harmless substances. The amount below the stoichiometric ratio needed to insure clean burning depends to a substantial extent on the mixture and particularly the burnable substance used. Empirical observation is best used to determine the exact ratio most advantageous to each mixture.

The decomposition of the hydrogen peroxide by itself does not create the temperatures contemplated by the present invention. A 50% aqueous solution of hydrogen peroxide passed through the manganese dioxide catalyst will raise the temperature of the device to approximately 395° F. However, with the addition of the burnable substance such as listed above, the operating temperature of the device is in the range of 1000° to 2000° F, depending in part on the fuel employed, its concentration, the nozzles employed and the rate of feed. As a result, the combustible material adds significantly to the coloric output of the system. Additionally, in order to achieve full combustion in such contemplated burnable substances as alcohols and sugar, for example, it is necessary to raise the temperature of the device to something above 800° F. For this reason, it is advantageous to simply provide a glow plug to initiate localized combustion.

The optimum combination found to date limited by maximum thermal output and mixture stability is 40% hydrogen peroxide, 40% water and around 20% burnable substance approaching the stoichiometric ratio of the material selected. In the case of sugar, 20% sugar by weight has been found highly satisfactory with 40% hydrogen peroxide and 40% water. This may generally be prepared, either before reaching the combustion chamber or at the combustion chamber, by mixing an aqueous solution of 50% hydrogen peroxide with sugar to arrive at the foregoing percentages by weight. If a higher percentage of hydrogen peroxide in the fuel mixture above about 42% is employed, (55% aqueous solution with burnable substance added) an insufficient margin of safety exists. Aqueous hydrogen peroxide in percentages of 63½% or greater are generally unstable. At lesser percentages of hydrogen peroxide, the thermal advantages are reduced. The minimum necessary to support burning under ideal conditions has been found to be 19.7% hydrogen peroxide, 7% sugar and the rest water, by weight.

Upon the introduction of the fuel with the glow plug warm, the decomposition of the hydrogen peroxide and the burning of the hydrocarbon contained in the mixture will begin. Hot gases will then be generated including a substantial amount of steam. The pressures are not intended to be contained by the liner 40. Rather, pressure is allowed to leak around, for example, the intersections of the liner with the inlet nozzle 56, the glow plugs 60 and 62, and the plug 64. Thus, during operation, the pressure within the insulation 42 may vary. However, it is intended that there not be a great deal of flow through the insulation area 42 so as to maintain good insulative qualities.

The utility of the method and apparatus defined here is substantial and varied. As with the aforementioned land speed record vehicle, the device may be used as a simple propulsion rocket. The device may also be used to drive turbines, to fill voids with hot steam, to provide a source of steam, or to provide a source of heat. Thus, the present apparatus and method have wide utility and allow the clean burning of a very wide range of materials.

While embodiments and applications of this application have been shown and described, it would be apparent to those skilled in the art that many more modifications are possible without departing from the inventive concepts herein. The invention, therefore, is not to be restricted except by the spirit of the appended claims.

What is claimed is:

1. A hot gas generator comprising:
    a reaction chamber having an outlet therefrom;
    a source of an aqueous solution in the range of about 21% to about 55% hydrogen peroxide by weight in homogeneous mixture with an exothermically burnable substance in an amount to support combustion, said source extending to said reaction chamber for dispersion of said mixture therein; and
    a permeable mass of a catalyst for decomposition of said hydrogen peroxide in said reaction chamber between said source and said outlet.

2. The hot gas generator of claim 1 wherein said exothermically burnable substance is alcohol.

3. The hot gas generator of claim 1 wherein said exothermically burnable substance is sugar.

4. The hot gas generator of claim 1 wherein said catalyst for decomposing said hydrogen peroxide in manganese dioxide.

5. The hot gas generator of claim 1 wherein said exothermically burnable substance is present in said mixture in an amount no greater than the stoichiometric amount.

6. The hot gas generator of claim 1 wherein said source includes a tank for containing said mixture, a pump being in fluid communication with said tank, and a nozzle being in fluid communication with said pump, said nozzle discharging into said reaction chamber.

7. The hot gas generator of claim 1 wherein said catalyst is natural pyrolusite granules.

8. A hot gas generator comprising:
    a reaction chamber having an outlet therefrom;
    a source of a substantially homogeneous mixture of hydrogen peroxide, water, and a burnable substance, the percentage of said hydrogen peroxide in the range of about 19% to than about 42% by weight, said source extending to said reaction chamber for dispersion of said mixture therein; and
    a permeable mass of manganese dioxide in said reaction chamber between said source and said outlet.

9. The hot gas generator of claim 8 wherein said magnanese dioxide is pyrolusite.

10. A process for generating a hot gas jet, comprising the steps of:
    dispersing a mixture of hydrogen peroxide in an aqueous concentration by weight within the range of about 21% to 55% by weight and an exothermically oxidizable substance in an amount to support combustion into a chamber;
    bringing said mixture into contact with a permeable mass of a catalyst for decomposing said hydrogen peroxide;
    igniting said substance; and
    directing the resulting products in a stream from said permeable mass.

11. The process of claim 10 wherein said step of dispersing a mixture includes dispersing a mixture of hydrogen peroxide, water and a burnable substance wherein said hydrogen peroxide is in an amount not exceeding 42%.

12. A fuel for creating hot gas, comprising an aqueous solution of hydrogen peroxide in concentration by weight within the range of about 21% to 55% by weight in homogeneous mixture with a burnable substance in near stochiometric ratio with said hydrogen peroxide.

13. The fuel of claim 12 wherein said aqueous solution of hydrogen peroxide is about 50% hydrogen peroxide by weight.

14. The fuel of claim 12 wherein said near stoichiometric ratio has less than a stoichiometric quantity of burnable substance to insure complete combustion.

15. A fuel for creating hot gas, comprising a substantially homogeneous mixture of hydrogen peroxide, water and a burnable substance, the percentage of said hydrogen peroxide being in concentration within the range of about 19% to about 42% by weight and said burnable substance being in near stochiometric ratio with said hydrogen peroxide.

* * * * *